(12) United States Patent
Shin et al.

(10) Patent No.: US 11,764,447 B2
(45) Date of Patent: Sep. 19, 2023

(54) BATTERY PACK WITH ENERGY DRAIN RESISTOR FOR PREVENTING FIRE PROPAGATION

(71) Applicant: LG ENERGY SOLUTION, LTD., Seoul (KR)

(72) Inventors: Eun-Gyu Shin, Daejeon (KR); Jeong-O Mun, Daejeon (KR); Jae-Min Yoo, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 144 days.

(21) Appl. No.: 17/298,261

(22) PCT Filed: Jun. 4, 2020

(86) PCT No.: PCT/KR2020/007302
§ 371 (c)(1),
(2) Date: May 28, 2021

(87) PCT Pub. No.: WO2021/029524
PCT Pub. Date: Feb. 18, 2021

(65) Prior Publication Data
US 2022/0021090 A1    Jan. 20, 2022

(30) Foreign Application Priority Data

Aug. 9, 2019    (KR) .................. 10-2019-0097677

(51) Int. Cl.
*H01M 50/572* (2021.01)
*H01M 10/613* (2014.01)
(Continued)

(52) U.S. Cl.
CPC ..... *H01M 50/572* (2021.01); *H01M 10/4207* (2013.01); *H01M 10/482* (2013.01);
(Continued)

(58) Field of Classification Search
CPC ............ H01M 10/613; H01M 10/625; H01M 10/637; H01M 10/6557; H01M 10/6571;
(Continued)

(56) References Cited

U.S. PATENT DOCUMENTS

2009/0176148 A1    7/2009  Jiang et al.
2010/0283427 A1   11/2010  Sugiyama et al.
(Continued)

FOREIGN PATENT DOCUMENTS

CN    101119035 A    2/2008
CN    101777782 A    7/2010
(Continued)

OTHER PUBLICATIONS

International Search Report (PCT/ISA/210) issued in PCT/Kr2020/007302. dated Sep. 15, 2020.
(Continued)

*Primary Examiner* — Karie O'Neill Apicella
(74) *Attorney, Agent, or Firm* — Birch, Stewart, Kolasch & Birch, LLP

(57) ABSTRACT

A battery pack includes a plurality of battery modules arranged along at least one direction, a resistor connected to an abnormal battery module that operates abnormally among the battery modules to absorb energy, an event detector provided to detect the abnormal battery module, a switch to connect or disconnect each of the battery modules to/from the resistor to selectively form a closed circuit, and a controller to receive information from the event detector and control the switch to form a current path between the abnormal battery module and the resistor.

10 Claims, 6 Drawing Sheets

(51) Int. Cl.
*H01M 10/625* (2014.01)
*H01M 10/637* (2014.01)
*H01M 10/6557* (2014.01)
*H01M 10/6571* (2014.01)
*H01M 10/42* (2006.01)
*H01M 10/48* (2006.01)

(52) U.S. Cl.
CPC ....... *H01M 10/613* (2015.04); *H01M 10/625* (2015.04); *H01M 10/637* (2015.04); *H01M 10/6557* (2015.04); *H01M 10/6571* (2015.04); *H01M 2200/108* (2013.01); *H01M 2220/20* (2013.01)

(58) Field of Classification Search
CPC ........... H01M 10/4207; H01M 10/482; H01M 50/572
See application file for complete search history.

(56) References Cited

U.S. PATENT DOCUMENTS

| 2012/0187914 | A1* | 7/2012 | Ha ........................ H02J 7/0029 320/134 |
| 2012/0236451 | A1 | 9/2012 | Nakashima et al. |
| 2013/0244077 | A1 | 9/2013 | Palanchon et al. |
| 2014/0038008 | A1 | 2/2014 | Saitou et al. |
| 2016/0359206 | A1* | 12/2016 | Eberleh ............... H01M 10/653 |

FOREIGN PATENT DOCUMENTS

| CN | 104701926 A | 6/2015 |
| JP | 2001-43902 A | 2/2001 |
| JP | 2002-142353 A | 5/2002 |
| JP | 2005-056654 A | 3/2005 |
| JP | 2007-128818 A | 5/2007 |
| JP | 2009-72039 A | 4/2009 |
| JP | 2013-074707 A | 4/2013 |
| JP | 2014-75906 A | 4/2014 |
| JP | 2014-135887 A | 7/2014 |
| JP | 2015-186331 A | 10/2015 |
| JP | 2018-170859 A | 11/2018 |
| JP | 2019-36397 A | 3/2019 |
| KR | 10-2010-0103661 A | 9/2010 |
| KR | 10-2013-0060144-1 | 7/2013 |
| KR | 10-2013-0122741 A | 11/2013 |
| KR | 10-2015-0030801 A | 3/2015 |
| KR | 10-1682457 B1 | 12/2016 |
| KR | 10-2018-0120821 A | 12/2018 |
| WO | WO 2012-105160 A1 | 8/2012 |

OTHER PUBLICATIONS

Extended European Search Report for European Application No. 20851714.4, dated May 17, 2022.

* cited by examiner

BATTERY PACK WITH ENERGY DRAIN RESISTOR FOR PREVENTING FIRE PROPAGATION

TECHNICAL FIELD

The present disclosure relates to a battery pack with a device for preventing fire propagation to an adjacent module when an event occurs in a specific module in the battery pack.

The present application claims the benefit of Korean Patent Application No. 10-2019-0097677 filed on Aug. 9, 2019 with the Korean Intellectual Property Office, the disclosure of which is incorporated herein by reference in its entirety.

BACKGROUND ART

As opposed to non-rechargeable primary batteries, secondary batteries are rechargeable and they are used as a source of power for not only high-tech small electronic devices such as mobile phones, PDAs, and laptop computers, but also energy storage systems (ESSs), electric vehicles (EVs) or hybrid vehicles (HEVs).

Currently widely used secondary batteries include lithium ion batteries, lithium polymer batteries, nickel cadmium batteries, nickel hydride batteries, nickel zinc batteries, etc. The operating voltage of a unit secondary battery cell or a unit battery cell is about 2.5V to 4.2V. Accordingly, when higher output voltage and energy capacity are required, a plurality of battery cells may be connected in series to build a battery module, or two or more battery modules may be connected in series or in parallel and other components may be added to construct a battery pack. For example, the battery module may include a plurality of secondary batteries connected in series or in parallel, and the battery pack may include battery modules connected in series or in parallel to increase the capacity and output.

The secondary batteries are charged and discharged by electrochemical reactions, and during charging and discharging, heat is generated. In this instance, when heat is not released well, degradation may be accelerated, and in some cases, fires or explosion may occur. However, since the battery pack is an assembly of battery modules, when a secondary battery fire or explosion occurs in a specific battery module, the fire or explosion may propagate to adjacent battery modules. In particular, automobile battery packs need a safety device since fires or explosions may lead to personal injury.

Accordingly, most of battery packs include a cooler to monitor the temperature of each battery module and maintain the temperature at an appropriate level, but there is no device for preventing fire or explosion propagation in case of emergency.

DISCLOSURE

Technical Problem

The present disclosure is designed solve the above-described problem, and therefore the present disclosure is directed to providing a battery pack with a safety device for preventing fire or explosion propagation to an adjacent battery module when an event occurs in a specific battery module in the battery pack.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

According to an aspect of the present disclosure, there is provided a battery pack including a plurality of battery modules arranged along at least one direction, an event detector provided to detect at least one abnormal battery module among the plurality of battery mod ides, a resistor connectable to the plurality of battery modules to absorb energy from the at least one abnormal battery module, a switch to connect or disconnect each of the plurality of battery modules to/from the resistor to selectively form a closed circuit, and a controller to receive information from the event detector and control the module switch to form a current path between the at least one abnormal battery module and the resistor.

The battery pack may further include partitions arranged in an alternating manner with the plurality of battery modules.

Each of the partitions may be provided as a cooling plate having a channel along which cooling water flows, and disposed in contact with at least one surface of one of the plurality of battery modules The resistor may be disposed in contact with one of the cooling plates.

The resistor may be in contact with the cooling plate that contacts an outermost battery module of the plurality of battery modules, such that a first surface of the cooling plate is in contact with the outermost battery module, and a second surface of the cooling plate is in contact with the resistor.

The resistor may include a block having a surface that contacts the cooling plate, and a heating wire provided in the block.

The switch may include a plurality of switches, each of the plurality of switches provided on a current path between a positive terminal of one of the battery modules of the plurality of battery modules and a first side of the resistor and a current path between a negative electrode of one of the battery modules of the plurality of battery modules and a second side of the resistor.

The controller may be configured to electrically connect the at least one abnormal battery module to the resistor by selectively turning on some of the switches of the plurality of switches.

The at least one abnormal battery module is two battery modules.

According to another aspect of the present disclosure, there is provided a vehicle including the battery pack. The vehicle may include an electric vehicle (EV) or a hybrid electric vehicle (HEV).

Advantageous Effects

According to an aspect of the present disclosure, when it is expected that an event will occur at a specific battery module within a battery pack, it is possible to prevent fire or explosion propagation to an adjacent battery module by releasing energy of the corresponding battery module through a resistor.

According to another aspect of the present disclosure, it is possible to cool the battery module in normal condition as a partition with a cooling function, and when an event occurs, block heat generated from an abnormal battery module, thereby preventing fire or explosion propagation to battery modules, and at the same time, to cool the resistor while draining energy.

Other effects of the present disclosure can be understood by the following description, and will be more clearly understood by the embodiments of the present disclosure.

DETAILED DESCRIPTION

Figure 1:
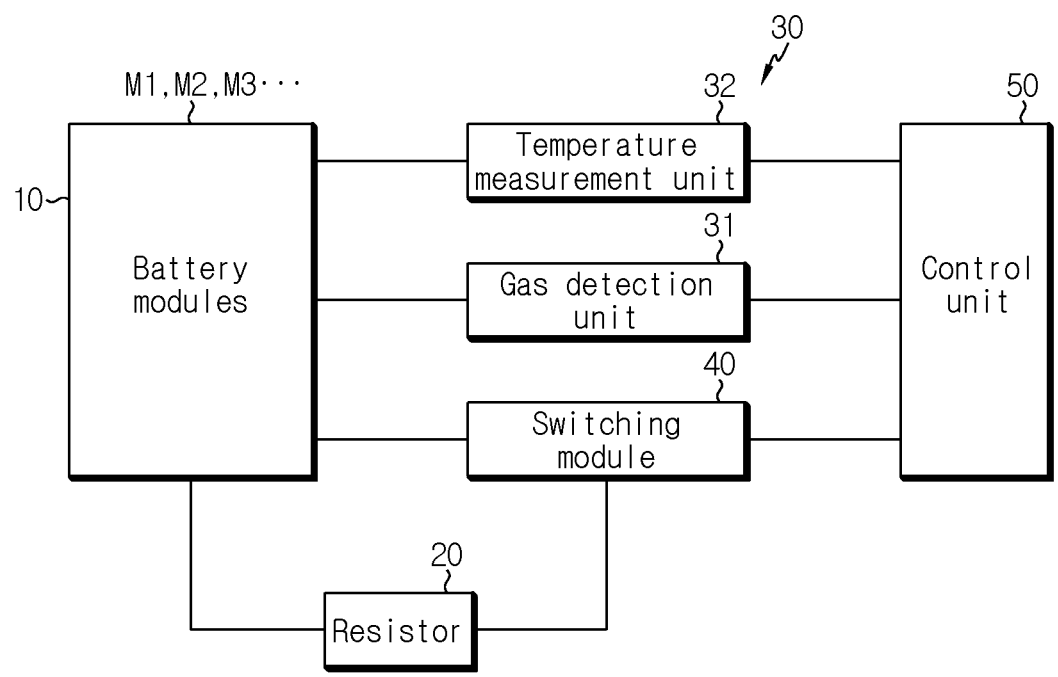
FIG. 1 is a block diagram of a battery pack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just some preferred embodiment of the present disclosure, but not intended to fully describe the technical aspects of the present disclosure, so it should be understood that a variety of other equivalents and modifications could have been made thereto at the time that the application was filed.

Figure 2:
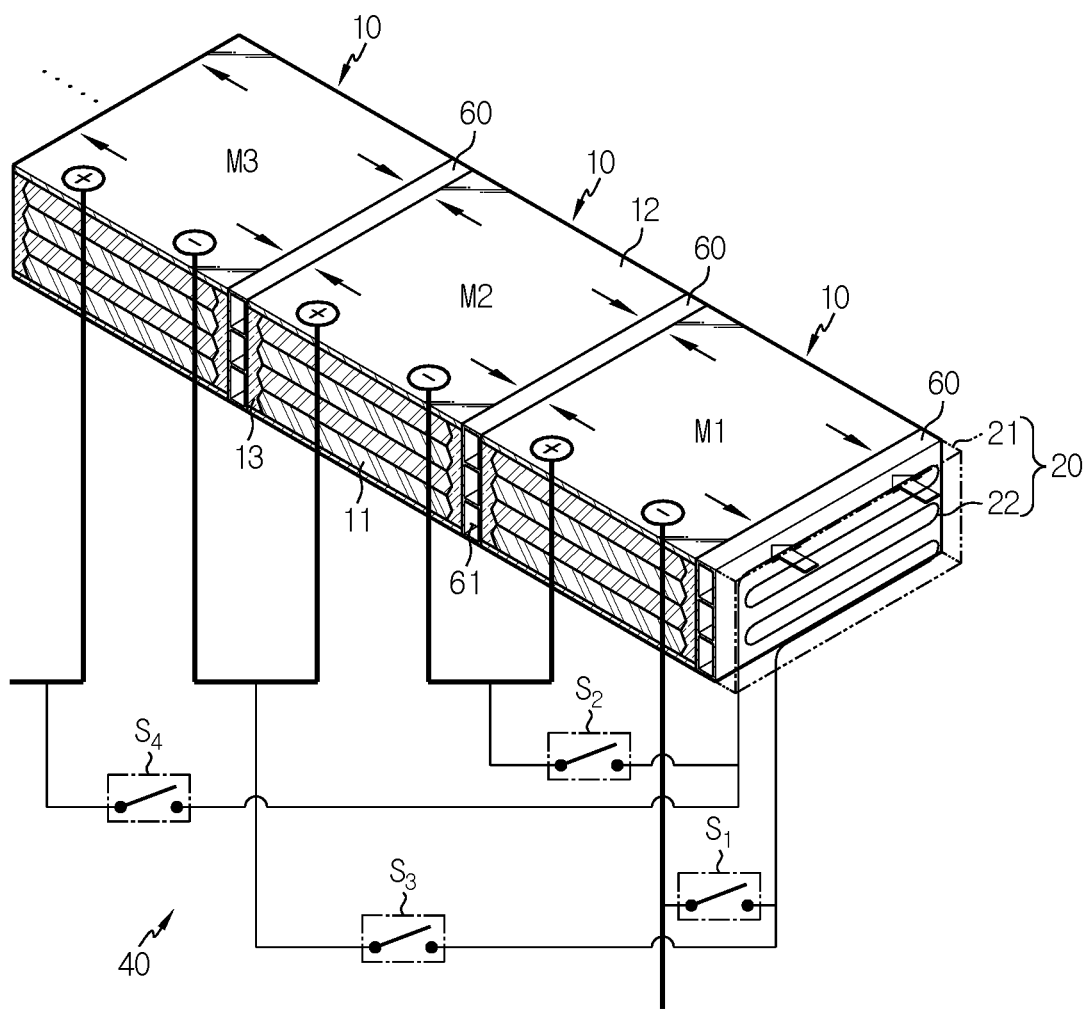
FIG. 2 is a schematic diagram showing the main components of a battery pack according to an embodiment of the present disclosure.

FIG. 1 is a block diagram of a battery pack according to an embodiment of the present disclosure, and FIG. 2 is a schematic diagram showing the main components of the battery pack according to an embodiment of the present disclosure.

Referring to FIGS. 1 and 2, the battery pack according to an embodiment of the present disclosure includes a plurality of battery modules 10, a resistor 20, an event detection unit 30, a switching module 40, a control unit 50 and a partition 60.

Although not shown, the battery pack further includes a pack case to receive the battery modules 10 and various types of devices to control the charge and discharge of the battery modules 10, such as a battery management system (BMS), a current sensor, a fuse, etc.

The battery modules 10 may be mounted in the pack case and arranged adjacent to each other along at least one direction. In this embodiment, although FIG. 2 shows three battery modules 10 arranged in one direction, the battery modules 10 may be arranged in various arrangements, for example, a 1×1 or 2×2 matrix arrangement, and there is no particular limitation on the number of battery modules 10.

Each of the battery modules 10 includes battery cells 11, and a module case 12 to receive the battery cells 11. The battery cells 11 may include pouch-type secondary battery cells.

As shown in FIG. 2, the pouch-type secondary battery cells may be stacked on top of each other and received in the internal space of the module case 12. In addition, a space between the inner walls of the module case 12 and two edges of the pouch-type secondary battery cells may be filled with a thermal interface material (TIM) 13. In this case, the TIM 13 may include a thermal pad having high thermal conductivity or resin. Heat generated from the pouch-type secondary battery cells may be transferred to the partition 60 in contact with the module case 12 through the TIM 13 and the two sides of the module case 12.

The partition 60 and the battery module 10 may be arranged in an alternating manner such that the partition 60 is interposed between the battery modules 10. For example, the internal space of the pack case may be divided into a plurality of spaces by the partitions 60, and each battery module 10 may be installed in each space.

In this way, when each battery module 10 is placed in each space divided by the partition 60, even if an event occurs in a specific battery module 10, the partition 60 may prevent the event from affecting the other battery modules 10, thereby minimizing damage (Here, the event refers collectively to an abnormal environment in which the battery module 10 is placed due to overheat, smoke, fire or explosion).

In the present disclosure, the partition 60 may be provided to divide the space in which each battery module 10 is installed and absorb heat from each battery module 10. For example, the partition 60 may be provided in the form of a cooling plate 60 having a channel 61 therein and serve as a heat sink to absorb the heat of the battery module 10.

Describing in more detail, the cooling plate 60 may be provided in the form of a plate having the channel 61 along which cooling water circulates and of size equal to or larger than the side of the battery module 10, and may come into contact with one side of the battery module 10 to cool the battery module 10.

Although not shown, the cooling plate 60 may further include cooling water inlet and outlet ports in communication with the channel 61 to allow cooling water to circulate along the channel 61 and extending to the inside/outside of the cooling plate 60. The two ports may be connected to cooling pipes installed at the inside/outside of the battery pack to receive cooling water.

As described above, in the present disclosure, the cooling plates 60 may be interposed between the battery modules 10 to play a role of cooling each battery module 10 in normal condition, and when an event occurs, serve as a protective wall to block the flame or impact of the specific battery module 10 in which the event occurred, in order to protect the other battery modules 10.

On the other hand, as described above, the battery pack according to the present invention includes the resistor 20, the event detection unit 30, the switching module 40 and the control unit 50 to minimize energy of the abnormal battery module 10 when the event occurs. This is to eliminate the risk of spreading the event to the surrounding battery module 10 by rapidly draining energy of the specific battery module 10 in which the event has occurred.

Hereinafter, an energy drain system of the specific battery module 10 according to an embodiment of the present disclosure will be described in detail with reference to FIGS. 3 and 4 together with FIGS. 1 and 2.

Figure 3:
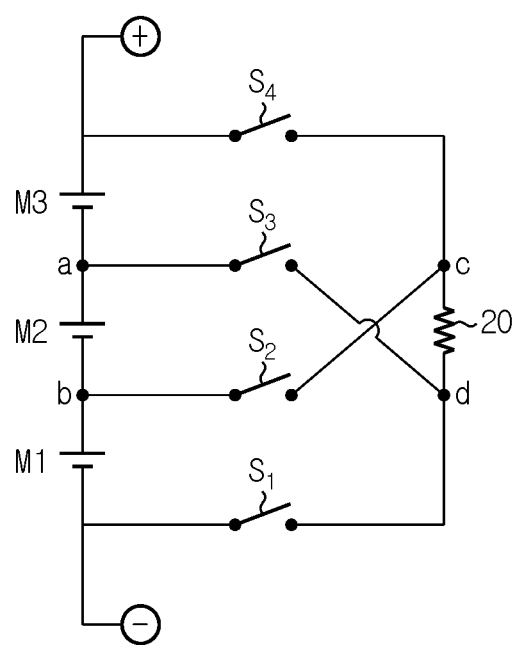
FIGS. 3 and 4 are circuit diagrams illustrating a battery pack before and after energy drainage according to an embodiment of the present disclosure.
Figure 4:
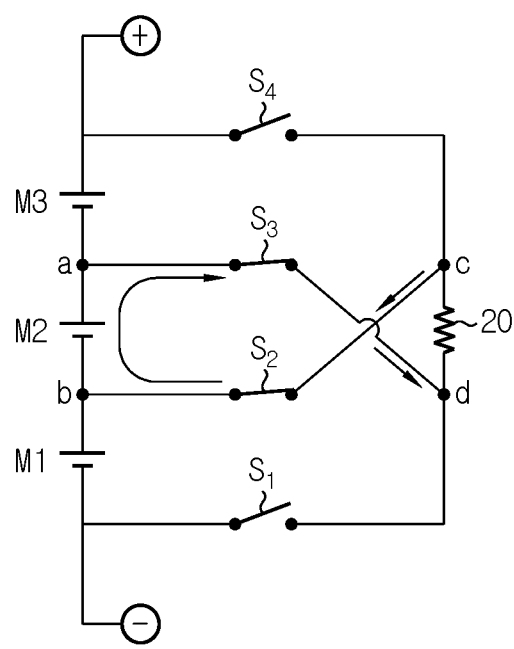

As shown in FIGS. 2 and 3, each battery module 10 may be connected in parallel to one resistor 20 through the switching module 40.

For reference, a plurality of resistors 20 corresponding to the number of battery modules 10 may be prepared and each battery module 10 and each resistor 20 may be matched on a one-to-one basis, but as the number of resistors 20 increases, the energy density per unit volume of the battery pack may decrease, the cost may increase and the burden of the assembly process may increase. Moreover, since the resistor 20 is configured to drain energy of the specific battery module 10 in abnormal operation, it is not good to put the plurality of resistors 20 in the battery pack. Accordingly, the present disclosure connects or disconnects one resistor 20 to/from each of the battery modules 10 through the switching module 40 to selectively form a closed circuit with the specific battery module 10.

The event detection unit 30 is configured to detect the specific battery module 10, i.e., the abnormal battery module 10 in which the event occurred among the battery modules 10, and may include a gas detection unit 31 and a temperature measurement unit 32.

The gas detection unit 31 may include at least one gas sensor provided in each battery module 10. The gas sensor may include a combustible gas sensor, for example, a contact combustion sensor, a semiconductor sensor (Pd gate MOSFET), a ceramic gas sensor (ZnO, F2O3, SnO2, NiO, CoO), etc.

The temperature measuring unit 32 may include at least one temperature sensor provided in each battery module 10. The temperature sensor may include a contact type temperature sensor that measures heat through contact with the battery cells 11 or a non-contact type temperature sensor that measures a heating wire 22 radiated from the battery cells 11.

As shown in FIG. 3, the switching module 40 may include switches, each provided on a current path between the positive terminal of each battery module 10 and one side of the resistor 20, and a current path between the negative terminal of each battery module 10 and the other side of the resistor 20.

The switches are kept in OFF state in normal condition, and selectively work in ON state only when an event occurs. The switches may include, for example, a mechanical or electronic relay switch.

The controller 50 plays a role in receiving information from the event detection unit 30 and controlling the switching module 40 to form a current path between the abnormal battery module 10 and the resistor 20.

The control unit 50 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors or electrical units for performing other functions. The control unit 50 may include memory.

The memory stores data, commands and software required for the overall operation of the device, and may include at least one type of storage medium of a flash memory type, a hard disk type, a solid state disk (SSD) type, a silicon disk drive (SDD) type, a multimedia card micro type, random access memory (RAM), static random access memory (SRAM), read-only memory (ROM), electrically erasable programmable read-only memory (EEPROM) or programmable read-only memory (PROM).

Specifically, an example of operation of the drain system when an event occurs in a specific battery module 10 is as follows.

For example, when the event occurs in the battery module M2, the gas sensor or the temperature sensor operates and a signal is transmitted to the controller 50. As shown in FIG. 4, the control unit 50 controls the switches $S_2$ and $S_3$ into ON state and the switches $S_1$ and $S_4$ into OFF state based on the signal to allow the current to flow between the specific battery module M2 and the resistor 20. Thus, the energy of the battery module M2 may be rapidly drained by the resistor 20.

In contrast, when it is assumed that an event occurred in the battery module M3, the controller 50 may control the switches S3 and $S_4$ into ON state and the switches $S_1$ and $S_2$ into OFF state to connect the battery module M3 to the resistor 20 in order to drain the energy.

In addition, when it is assumed that an event occurred in the battery module M1, the control unit 50 may control the switches $S_1$ and $S_2$ into ON state and the switches $S_3$ and $S_4$ into OFF state to connect the battery module M1 to the resistor 20 in order to drain the energy.

Meanwhile, heat energy generated by the resistor 20 during the energy drain process may be released through the above-described cooling plate 60.

To this end, the resistor 20 may include a block 21 having a surface that contacts the cooling plate 60 and a heating wire 22 provided in the block 21. One side and the other side of the heating wire 22 may be connected to each battery module 10.

Referring back to FIG. 2, the resistor 20 may be disposed in contact with the cooling plate 60 that contacts the battery module 10 positioned at the outermost side in an arrangement order. Here, one surface of the cooling plate 60 may be used for contact with the right surface of the battery module 10, and the other surface of the cooling plate 60 may be used for contact with the resistor 20.

As such, the present disclosure solves the problems with heat energy release of the resistor 20 and space efficient installation of the resistor 20 at the same time by installing the resistor 20 in the cooling plate 60 disposed on the outer surface of the outermost battery module 10.

Subsequently, a battery pack according to another embodiment of the present disclosure will be described with reference to FIGS. 5 and 6.

The battery pack according to another embodiment of the present disclosure has substantially the same configuration as the battery pack according to the above-described embodiment, only different in the configuration of the battery pack and the switching module 40. A description of the same element will be omitted.

The switching module 40 of the above-described embodiment configured to connect one specific battery module 10 in which an event occurred to the resistor 20, while the switching module 40 of another embodiment of the present invention is configured to deal with events occurring in two or more battery modules 10 at the same time. In addition, the control unit 50 of this embodiment is configured to control the switching module 40 to electrically connect the at least one abnormal battery module 10 to the resistor 20 by selectively turning on some of the switches.

Figure 5:
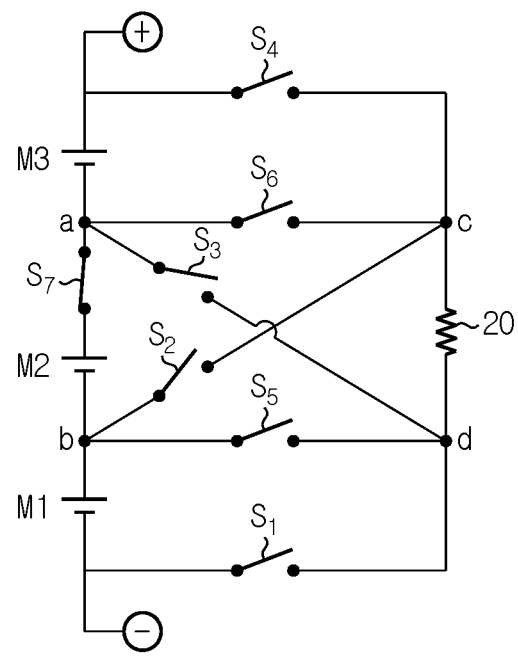
FIGS. 5 and 6 are circuit diagrams illustrating a battery pack before and after energy drainage according to another embodiment of the present disclosure.

For example, the energy drain circuit according to this embodiment may be implemented as shown in FIG. 5. It may be formed by adding, to the circuit of FIG. 3, one more branch and switch each between node a and node c and between node b and node d, and one more switch between node a and node b. Additionally, in this embodiment, the switches $S_1$ to $S_6$ are placed in OFF state and the switch $S_7$ is placed in ON state in normal condition.

According to this energy drain circuit configuration, for example, when an event occurs in the battery module M2, the gas sensor or the temperature sensor operates and a signal is transmitted to the control unit 50, the control unit 50 controls the switches S2 and S3 S7 into ON state and all the remaining switches S1, S4, S5, S6 into OFF state based on the signal. In this case, the energy of the battery module M2 may be rapidly drained by the resistor 20.

Figure 6:
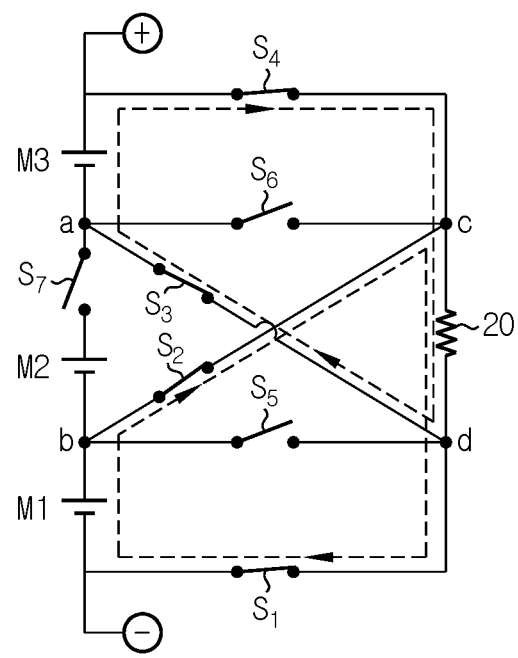

When it is assumed that an event occurs at the same time in the battery modules M1 and M3, as shown in FIG. 6, the controller 50 controls the switches S1, S2, S3, S4 into ON state and the switches S5, S6, and S7 into OFF state to connect the battery modules M1 and M2 to the resistor 20 in order to drain their energy.

Additionally, when it is assumed that an event occurred the battery modules M2 and M3 at the same time, the control unit 50 may control the switches S4, S5, S7 into ON state and all the remaining switches S1, S2, S3, S6 into OFF state to connect the battery modules M2 and M3 to the resistor 20 in order to drain their energy.

Therefore, the battery pack according to another embodiment of the present disclosure may cope with a situation in which an event occurs in a plurality of battery modules 10 at the same time, and thus is safer than the battery pack of the above-described embodiment.

The battery pack according to the present disclosure as described above may be applied to vehicles such as electric vehicles or hybrid electric vehicles. Of course, the battery pack may be applied to energy storage systems or other IT products.

While the preferred embodiments of the present disclosure have been hereinabove illustrated and described, the present disclosure is not limited to the above-described particular preferred embodiments and it is obvious to those skilled in the art that various modifications may be made thereto without departing from the subject matter of the present disclosure and such modifications fall within the scope of the appended claims.

It should be noted that the terms indicating directions as used herein such as upper, lower, left and right are used for convenience of description only, and it is obvious to those skilled in the art that the term may change depending on the position of an observer or the stated element.

What is claimed is:

1. A battery pack comprising:
a plurality of battery modules connected in series;
an event detector provided to detect at least one abnormal battery module among the plurality of battery modules;
a resistor connectable to the plurality of battery modules to absorb energy from the at least one abnormal battery module;
a plurality of switches connected in parallel between the plurality of battery modules and the resistor to connect or disconnect each of the plurality of battery modules to/from the resistor to selectively form a closed circuit; and
a controller to receive information from the event detector and control the switch to form a current path between the at least one abnormal battery module and the resistor.

2. The battery pack according to claim 1, further comprising:
partitions arranged in an alternating manner with the plurality of battery modules.

3. The battery pack according to claim 2, wherein each of the partitions is provided as a cooling plate having a channel along which cooling water flows, and disposed in contact with at least one surface of one of the plurality of battery modules.

4. The battery pack according to claim 3, wherein the resistor is disposed in contact with one of the cooling plates.

5. A battery pack comprising:
a plurality of battery modules arranged along at least one direction;
an event detector provided to detect at least one abnormal battery module among the plurality of battery modules;
a resistor connectable to the plurality of battery modules to absorb energy from the at least one abnormal battery module;
a switch to connect or disconnect each of the plurality of battery modules to/from the resistor to selectively form a closed circuit;
a controller to receive information from the event detector and control the switch to form a current path between the at least one abnormal battery module and the resistor; and
partitions arranged in an alternating manner with the plurality of battery modules,
wherein each of the partitions is provided as a cooling plate having a channel along which cooling water flows, and disposed in contact with at least one surface of one of the plurality of battery modules,
wherein the resistor is in contact with the cooling plate that contacts an outermost battery module of the plurality of battery modules, and
wherein a first surface of the cooling plate is in contact with the outermost battery module, and a second surface of the cooling plate is in contact with the resistor.

6. The battery pack according to claim 5, wherein the resistor includes a block having a surface that contacts the cooling plate, and a heating wire provided in the block.

7. The battery pack according to claim 1, wherein each of the plurality of switches is provided on a current path between a positive terminal of one of the battery modules of the plurality of battery modules and a first side of the resistor and a current path between a negative electrode of one of the battery modules of the plurality of battery modules and a second side of the resistor.

8. The battery pack according to claim 7, wherein the controller is configured to electrically connect the at least one abnormal battery module to the resistor by selectively turning on some of the switches of the plurality of switches.

9. The battery pack according to claim 7, wherein the at least one abnormal battery module is two battery modules.

10. A vehicle comprising the battery pack according to claim 1.

* * * * *